United States Patent [19]
Mott-Smith

[11] 3,893,539
[45] July 8, 1975

[54] MULTIPLE AIR GUN ARRAY OF VARIED SIZES WITH INDIVIDUAL SECONDARY OSCILLATION SUPPRESSION

[75] Inventor: Lewis M. Mott-Smith, Houston, Tex.

[73] Assignee: Petty-Ray Geophysical, Inc., Houston, Tex.

[22] Filed: Sept. 28, 1973

[21] Appl. No.: 401,856

Related U.S. Application Data

[63] Continuation of Ser. No. 291,881, Oct. 21, 1972, abandoned.

[52] U.S. Cl. ............... 181/115; 181/120; 181/111; 340/7 R
[51] Int. Cl. .......................................... G01v 1/02
[58] Field of Search .......... 181/.5 NC, .5 XC, .5 A, 181/.5 H, 120, 111, 115; 340/3 T, 12 R

[56] References Cited
UNITED STATES PATENTS

| | | | |
|---|---|---|---|
| 3,187,831 | 6/1965 | Smith | 181/.5 NC |
| 3,437,170 | 4/1969 | Brock et al. | 181/120 |
| 3,601,216 | 8/1971 | Mott-Smith | 181/.5 H |
| 3,653,460 | 4/1972 | Chelminski | 181/120 |

OTHER PUBLICATIONS

"PAR Sound Source," Bolt Associates, *Product Brochure*, 10 Fitch St., E. Norwalk, Conn., 06855.

*Primary Examiner*—Maynard R. Wilbur
*Assistant Examiner*—H. A. Birmiel
*Attorney, Agent, or Firm*—Arnold, White & Durkee

[57] ABSTRACT

An underwater seismic source for generating an improved seismic signal employing a spaced array of air guns of different sizes to generate an initial bubble impulse and to suppress the cumulative effect of secondary bubble impulses. The combination includes means for providing further secondary bubble suppression integral with one or more of the guns in the array. The sizes, minimum spacings, and secondary bubble suppression techniques are intimately combined to provide an underwater seismic source having an acoustic pressure signature wherein the amplitude of the initial impulse, including the signal reflected from the water surface, is from eight to twelve times the amplitude of any subsequent bubble impulses, including their surface reflections.

11 Claims, 7 Drawing Figures

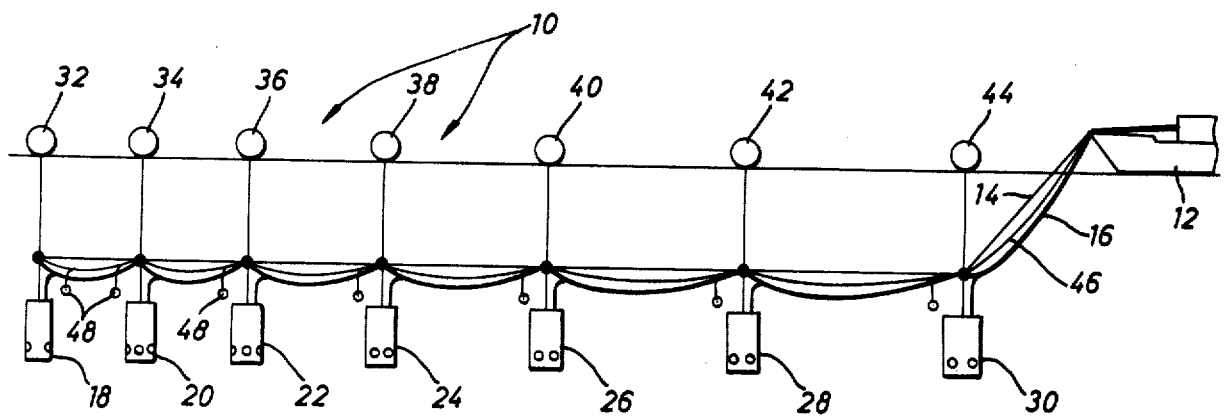
FIG. 1
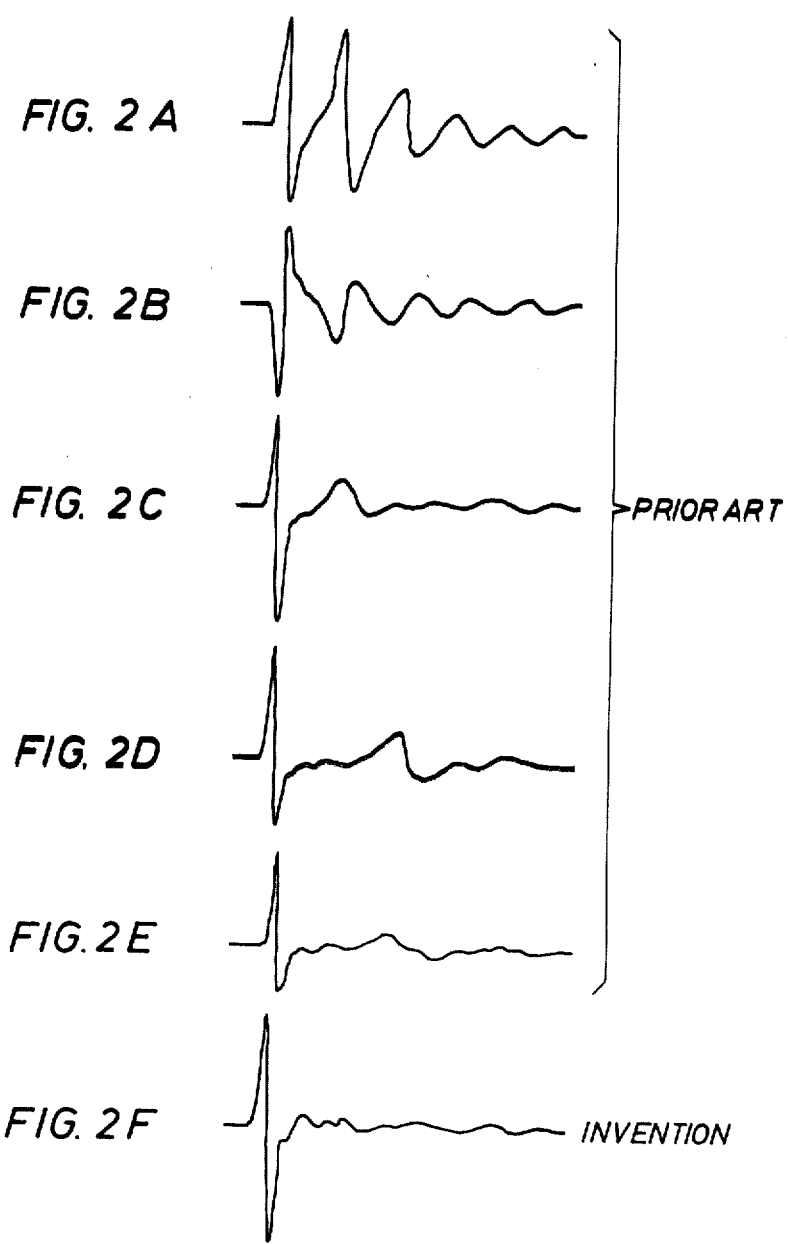
FIG. 2A
FIG. 2B
FIG. 2C
FIG. 2D
FIG. 2E
PRIOR ART
FIG. 2F
INVENTION

MULTIPLE AIR GUN ARRAY OF VARIED SIZES WITH INDIVIDUAL SECONDARY OSCILLATION SUPPRESSION

BACKGROUND OF THE INVENTION

This application is a continuation of copending application Ser. No. 291,881, filed Oct. 21, 1972, now abandoned. The invention relates to apparatus and methods of seismic exploration in a marine environment, and particularly to apparatus and methods for generating improved seismic pulses under water.

It is well known that the preferred acoustic pulse for use in seismic exploration has the form of a single short impulse, rather than a train of pulses or other type of acoustic disturbance of relatively long duration. In the past, such single pulses have been generated underwater by firing an explosive charge near the surface of the water to vent the explosion to the atmosphere and thus preclude the generation of secondary oscillations. This process requires large amounts of explosives, and is dangerous and costly. Furthermore, explosive charges cannot be deployed and fired at sufficiently short intervals to allow their efficient use in a continuous survey operation.

One method of generating a single pulse while avoiding the objectionable features of explosives utilizes an air gun, which generates a pulse by the sudden discharge of a quantity of high pressure compressed air into the water. However, the strength of the pulses generated by presently existing air guns is not great enough to permit their firing near the water surface to preclude generation of secondary oscillations, as was done with explosives. Rather, it is necessary to fire the air gun at a reasonable depth, where there is much less loss of signal strength. When firing at such depths, however, the elasticity of the air couples with the inertial mass of the surrounding water to produce an oscillating system. The air bubble will grow and shrink at its natural period until the energy is dissipated to the water and the bubble comes to its equilibrium volume. The oscillations so produced are undesirable because they produce secondary pressure pulses which interfere with the obtaining of the desired seismic information.

A number of methods have been devised and put into practice for suppressing bubble oscillation to improve the seismic pressure signature of such air gun seismic sources. One such method is to surround the air gun with a perforated shell of a selected area of perforations as taught, for example, by U.S. Pat. No. 3,525,416 to L. Mott-Smith. However, the dimensions of the perforated shells required for satisfactory bubble suppression have been found to be too large for efficient use in some applications.

Another approach to reducing the effect of secondary oscillations is to employ a number of guns of different sizes, instead of one or a few guns of the same size. Such arrangements reduce the composite amplitude of the secondary bubble impulses relative to the impulse generated by the primary bubble, because the frequency of each bubble's oscillation depends upon its size, which in turn depends upon the size of the gun's pressure chamber. When all of the guns in such a group are fired at the same time, the amplitude of the main impulse will be equal to the sum of the amplitudes of the impulses generated by the individual guns. However, the sum of the amplitudes of the secondary bubble impulses will be relatively less, since they do not occur at the same time because of their differing frequencies. That is, the time intervals between impulses are different for each different size of gun. Accordingly, the distinction between the summed primary impulses and secondary impulses is more readily apparent, and an improved pressure signature results. An example of this latter method, employing a number of guns of different sizes, is shown in U.S. Pat. No. 3,437,170 to Brock, et al. However, the signature obtainable by this method is not by any means an optimum signature and requires an uneconomically large number of guns.

An optimum signature is considered to be one in which the amplitude of the first impulse, including the signal reflected from the water surface, is at least eight times the amplitude of any subsequent bubble impulse, including its surface reflection. The approach of Brock, et al., fails to provide a signature with an eight to one ratio, and typically provides a maximum ratio of five to one even when utilizing a highly impractical number of guns, e.g., twenty to thirty.

A further method of secondary bubble suppression employs an air gun to generate an initial bubble to provide the first impulse, and thereafter employs some means for injecting a second quantity of air into the expanding initial bubble as it approaches its maximum diameter. Typical of such a method is one employing a dual volume air gun, the two volumes being separated by a dividing wall which includes a flow limiting orifice of selected size. The initial bubble is formed upon firing the gun by rapid release of the first volume of pressurized air, following which secondary bubble suppression is effected by the relatively slower release of the second volume of pressurized air through the orifice between the first and second volumes. Release of this second volume of air into the initial bubble tends to slow its subsequent contraction, and the performance of this method depends on the amount of air employed for suppression. Since this second volume of air would otherwise be available to generate the initial impulse, the amplitude of the initial impulse is reduced in proportion to the amount or percentage of suppression applied. It has been found that to produce a substantially improved signature by this means alone, two thirds or more of the total air gun volume must be used for suppression. Accordingly, if it is desired to maintain the same initial impulse amplitude, either a gun with three times the chamber volume or nearly twice as many guns of the same chamber volume would be required. The weight, size, and cost of the air compressing machinery required, and also the extra cost of the guns, render such a system entirely impractical. Furthermore, a signal-to-bubble ratio of five to one is typically maximum for this suppression technique.

Another technique for secondary bubble suppression by the injection of additional air is described in U.S. Pat. No. 3,601,216 to L. Mott-Smith. This technique employs, inter alia, a second, low pressure, volume of air disposed adjacent an air gun, and secondary bubble suppressing air is introduced into the initially expanding bubble generated by the first volume of high pressure compressed air released by the gun as the bubble approaches maximum diameter. Although less air is required by this method than by the dual volume gun, the apparatus required is more complex and expensive.

Neither of the preferred prior art techniques, viz, the dual volume air gun nor the use of a large number of guns of different sizes, can alone approach the desired eight to one signal-to-bubble ratio, despite resort to extreme measures which are so highly unsatisfactory and impractical in the field as to be unused in seismic exploration.

SUMMARY OF THE INVENTION

The present invention provides a seismic source and a method for generating a seismic pulse which defines a signature having a signal-to-bubble ratio of from eight to one through twelve to one and greater, and does so by utilizing a relatively small number of guns of selected different sizes and spacings, in combination with integral bubble suppression in at least one of the guns.

The term "signature" as used herein is more precisely defined as the instantaneous value of the acoustic pressure as a function of time, while the previously mentioned ratio of first bubble impulse to subsequent bubble impulse including the respective surface reflections of each, is hereinafter termed the "signal-to-bubble" ratio.

The term "pulse suppression" refers to the seismic energy sources as a whole, including in this case a number of individual guns, while the term "bubble suppression" refers to individual bubble generating apparatus.

In the present invention a plurality of guns are disposed in a selected array, the guns having different chamber volumes selected for improved secondary pulse suppression and at least one of the guns having means for secondary bubble suppression. In one embodiment, a linear array of guns, spaced at increasing intervals, includes gun chamber volume sizes ranging from 70 to 450 cubic inches. The guns are spaced apart from one another a distance sufficient to prevent coalescense between adjacent bubbles when at their respective maximum diameters.

In one aspect, the integral bubble suppression involves use of dual volume air guns employing on the order of one-fourth of the total initial compressed air within the respective chambers for suppression of the initial air bubble. In this respect the combination of the present invention contemplates retaining a relatively small portion of the initial compressed air charge in selected individual gun chambers, firing the guns together to generate respective initial seismic bubbles of different sizes, and then issuing the respective second volume of compressed air sufficiently slowly so that a portion of that second volume of air continues to enter the respective bubble upon its reaching maximum size. Optimum operation is achieved by applying the seconday bubble suppression technique to all of the guns in the array.

The present invention has the distinct advantages of the simple, dual volume air gun while requiring only a fraction of the initially compressed air for secondary bubble supression. In addition, a relatively small number of such air guns are required in the array of the present invention to produce a seismic signal having a signal-to-bubble ratio of as much as twelve to one or greater. This is considerably better than the minimum required for satisfactory underwater seismic exploration, and is considerably better than the signal-to-bubble ratio generated by any air gun or array presently in the field.

The configuration of the array and the use of secondary bubble suppression in accordance with this invention can also readily be applied when utilizing other types of bubble generating seismic sources, for example, gas guns, explosives, and the like.

BRIEF DESCRIPTION OF THE DRAWINGS

FIG. 1 is a simplified elevation depicting one embodiment of the invention array.

FIG. 2A-2F are a series of graphs comparing the signatures generated by prior art methods of producing seismic signals with a signature typical of the improved method and apparatus of the invention combination.

DESCRIPTION OF THE PREFERRED EMBODIMENTS

Referring to FIG. 1, there is shown, by way of description only, an array 10 of air guns in accordance with one embodiment of the present invention. The array 10 is secured to a ship 12 by conventional towing cables 14. The ship includes the usual air compressors, plumbing, valves, etc., (not shown), supplying high pressure air of the order of 2,000 psi to the series of guns, through an air line 16. The guns, herein numbered 18-30, are secured to respective buoys or floats 32-44 which support the guns at a predetermined level under the water surface, e.g., 30 feet. The guns 18-30 in this exemplary array have sizes, or total chamber volumes, of 70, 90, 120, 150, 200, 300, and 450 cubic inches respectively, and are spaced apart at (increasingly greater) distances of 8, 8, 9, 10, 12, and 14 feet, respectively.

As may be seen, the distance between guns generally increases in proportion to the maximum diameter of the initial bubble generated. The distances are chosen sufficiently large to prevent interference between guns, i.e., to prevent bubble coalescense. The relationship between maximum bubble diameter, air gun chamber volume, the pressure to which the air guns are charged, and the depth of the gun beneath the water surface is generally known in the marine seismic exploration field, and the minimum gun spacings may readily be determined by those of ordinary skill in this art.

The usual electrical wire complex 46 extends from the ship 12 to each of the guns 18-30, and supplies conductors for simultaneously firing the plurality of guns. Because there are differences in the actual firing times of the guns, even though energized with exactly the same firing signal, a hydrophone 48 is placed near each gun 18-30 and connected to timing equipment on the ship 12 through the wire complex 46. Each gun can be fired individually to determine electronically, by a signal generated by that gun's corresponding hydrophone, the exact delay between when the gun was energized and when it actually fired. An adjustable electronic time delay (not shown) may then be employed with each gun to compensate for its particular firing delay characteristic, whereby all guns actually fire simultaneously when energized by a common firing signal.

The ship 12 is depicted here as being attached to the end of the array 10 having the largest gun 30, since the weight of the larger gun 30 tends to stabilize and hold the array at the selected depth in the water during towing. It will be appreciated, however, that the array 10 may be towed from either end and that the guns do not need to be arranged in increasing or decreasing order of size. Any random sequence or arrangement of guns may be employed, as long as the spacings between the guns are sufficient to prevent coalescence of any adjacent bubbles upon their reaching maximum diameters.

In addition, although a linear array configuration is herein depicted, any geometrical arrangement may be employed, for example, the guns may be disposed in a rectangular, staggered, or other pattern if so desired. Also two arrays may be towed in spaced-apart relation by one ship, so that a gun in one array may be fired in place of the corresponding gun in the second array without decreasing the efficiency of the system. Thus, if breakdown of one or more guns of either array should occur during the surveying process, there is no need to immediately discontinue the survey until repairs are made, nor is the energy and efficiency of the array decreased.

In the embodiment of this invention illustrated in FIG. 1, each of the air guns 18–30 includes means for suppressing secondary bubble oscillations. In this example, the guns are fabricated with a dual chamber configuration, the volume of the first chamber being the initial pulse volume, and the volume of the second chamber being the bubble suppression volume. An orifice or opening of selected size is located in a dividing plate between the two chambers or volumes so that the pressurized air in the bubble suppression volume is ejected at a relatively slow rate from the gun and into the expanding initial bubble generated by the preceeding rapid ejection of the pressurized air in the initial pulse volume. Typical of an air gun having such a configuration is one manufactured by Bolt Associates, Inc., under the trademark PAR air guns.

In the present invention the volume of the second chamber, that is the bubble suppression volume, is on the order of from ¼ to ⅓ of the total chamber volume, and preferably is between about 25 percent and about 33 percent of the total volume. This is in contrast to the prior art suppression apparatus and methods, which have required that as much as 90 percent of the total gun volume be devoted to bubble suppression, without achieving production of seismic impulses having signature characteristics as good as those of the impulses produced by the combination of the present invention. It will be appreciated that when 30 percent to 90 percent of the compressed air available in the gun is employed to suppress, rather than generate, the initial impulse, the energy of the initial impulse is correspondingly and substantially decreased for a gun of the same total size. Thus, the signal-to-bubble ratios of previous devices do not inherently increase with added suppression because a decrease in the initial impulse strength is caused by using a greater proportion of the air chamber volume, and thus air, for suppression. In order to provide greater initial impulse strength in an attempt to obtain an improved (though not optimum) signal-to-bubble ratio, the prior art taught that a gun with three times the chamber volume, or approximately twice as many guns of the same volume, would be required. The weight, size, and cost of the air compressing machinery required, and also the extra cost, bulkiness, complexity, and the like of the guns themselves, render such an approach both technically and economically impractical.

It is readily apparent that the apparatus and methods of the present invention effect a marked savings in the amount of compressed air required and thus in the size, weight, expense and complexity of the associated air compressors, while providing an equally marked improvement in the signature of the seismic pulse generated by the combination. To illustrate, the invention array generates an underwater seismic pulse having a twelve to one signal-to-bubble ratio while utilizing conventional compressor machinery; e.g., three 180 horsepower air compressors which deliver about 400 cubic feet per minute of air at 2000 pounds per square inch pressure. This is the same air compression capability that the prior seismic sources required to produce a pulse having a five to one signal-to-bubble ratio.

The improved signature generated by apparatus and methods in accordance with the present invention is shown in FIG. 2 in which a comparison is made between signatures of existing prior art air gun sources (FIGS. 2A–2E), and that of one embodiment of the present invention (FIG. 2F). More particularly, the efficiency of the various sources is herein compared by calculating the signal-to-bubble ratio of each signature shown. FIG. 2A illustrates the signature of a conventional large air gun with no secondary oscillation suppression. The resulting signal-to-bubble ratio is only about 1.2 to one. FIG. 2B illustrates the signature of an air gun seismic source surrounded by a selectively perforated shell, wherein the signal-to-bubble ratio is of the order of 2.4 to one. In FIG. 2C the typical signature generated by a prior art array employing different size guns along is seen to have a signal-to-bubble ratio of about five to one.

FIGS. 2D and 2E show the signatures of prior art air guns employing the dual volume secondary bubble oscillation suppression technique described above. In FIG. 2D, approximately 30 percent of the total gun volume is used for bubble suppression, and, in FIG. 2E, on the order of 70 percent of the total volume is used for bubble suppression. The signal-to-bubble ratios are of the order of 3.4 to one and five to one, respectively, much less than the recognized desirable ratio of eight to one. As discussed above with reference to the dual volume suppression technique, the five-to-one ratio has been regarded as the practical maximum which would be obtained from a single dual volume gun.

FIG. 2F shows the signature generated by an embodiment of the present invention, taken with broadband response. The signal-to-bubble ratio illustrated is of the order of 12.5 to one. This greatly improved, and heretofore unattainable, signal-to-bubble ratio, is obtained in the present invention by using an array of only seven guns, as depicted in FIG. 1, each of the guns having a dual volume chamber but with less that 33 percent of the total air volume being used for suppression of secondary bubble impulses.

The means for suppressing secondary bubble oscillations in the invention combination of FIG. 1 described above may be replaced with other means presently known in the art. For example, an additional gun timing/firing mechanism may be added to one of the guns in the array, whereby the gun may be fired twice in timed sequence to provide both the initial and secondary bursts of air. Alternately, a second gun or an air tank may be disposed adjacent to one of the air guns for injection of suppressing air into the initial bubble as it approaches its maximum diameter to provide secondary bubble suppression. These latter suppression techniques are fully described in U.S. Pat. No. 3,601,216 of previous mention.

Although the present invention has been described with respect to a particular array configuration of varied gun sizes, suppression techniques, and the like, it is to be understood that other combinations of sizes and spacings are possible within the scope of the invention.

In addition, the air guns may be replaced by other forms of guns; for example, gas exploding devices, explosives, or other devices, which generate a rapidly expanding bubble underwater. In all such energy sources, bubble generation is based on the same theory, that is, in general, the energy of the impulse is proportional to the bubble size, which is in turn proportional to the energy released by the seismic source, regardless of what type of phenomenon is used to generate the bubble.

Thus gas exploding guns of different sizes may be employed in place of the air guns shown in FIG. 1. On the other hand, a string of different amounts of explosives may be utilized in the array configuration of FIG. 1. Those skilled in the marine seismic art can readily determine the various sizes and spacings of energy sources which may alternatively be used in the present invention in place of the air gun array configuration depicted by way of example in FIG. 1 It will further be appreciated that secondary bubble suppression also can be effected in the invention combination by the alternative techniques described above. For example, if explosives are substituted for the air guns in the array of the present invention, air for secondary bubble suppression may be provided from an auxiliary source as disclosed in U.S. Pat. No. 3,601,216 referred to above.

Accordingly, it is seen that the present invention provides apparatus and methods for producing underwater seismic pulses for use in seismic exploration, that such pulses are far superior to those heretofore obtainable, and that combinations of seismic source arrays and bubble suppression systems may be tailored to satisfy given needs.

What is claimed is:

1. An array of underwater seismic energy sources for generating a desired seismic pulse at a selected depth in a water medium, comprising in combination:
    a plurality of seismic energy sources of different energies for producing a like plurality of initially expanding bubbles of correspondingly different maximum diameters and oscillation frequencies, the sources being spaced apart from one another sufficiently to prevent coalescence of adjacent bubbles;
    bubble suppression means operatively associated with at least one of the sources to suppress secondary oscillations of the bubble produced by the corresponding source; and
    actuating means coupled to each of the sources for simultaneously producing the plurality of bubbles to generate the desired seismic pulse.

2. The array of underwater seismic sources recited in claim 1, wherein the seismic sources are air guns having different chamber volumes.

3. The array of underwater seismic sources recited in claim 1, wherein the bubble suppression means comprises means for introducing a quantity of gas into the corresponding initially expanding bubble.

4. The array of underwater seismic sources recited in claim 1, wherein the actuating means includes adjustable timing means for actuating all of the sources simultaneously.

5. A multiple gun array for generating a seismic pulse having an improved signature in a water medium, comprising in combination:
    a plurality of guns, each of the guns having a first chamber and a second chamber, the volumes of the respective first chambers being different from one another for producing a like plurality of initially expanding bubbles of correspondingly different maximum diameters by suddenly ejecting respective first volumes of compressed gas at a selected water depth, the guns being spaced apart from one another sufficiently to prevent coalescence of adjacent bubbles;
    said guns including means for introducing respective second volumes of compressed gas from said second chambers into the corresponding bubbles to suppress secondary oscillation of the bubbles; and
    actuating means coupled to each of the guns for firing the guns to simultaneously eject the first volumes of compressed gas to generate the seismic pulse.

6. The multiple gun array as recited in claim 5, wherein respective first and second chambers of the guns are connected by a flow limiting orifice, the orifice so restricting flow from the second chamber to the first chamber that some portion of the respective second volumes of compressed gas is introduced into the corresponding bubbles as the bubbles approach their maximum diameters.

7. The multiple gun array as recited in claim 6, wherein the volumes of the respective second chambers are not more than one third of the total volumes of the corresponding guns.

8. The multiple gun array as recited in claim 7, comprising not more than seven air guns.

9. A method for generating an underwater seismic pulse having a signal-to-bubble ratio signature of at least eight-to-one, comprising the steps of:
    placing a plurality of bubble generating devices of different sizes in spaced apart relationship, the devices being spaced apart sufficiently to prevent coalescence of adjacent bubbles;
    simultaneously actuating the bubble generating devices to produce a like pluraltiy of initially expanding bubbles of correspondingly different maximum diameters; and
    introducing a guantity of compressed gas into at least one of the bubbles as the bubble approaches its maximum diameter to suppress secondary oscillations thereof.

10. The method for generating an underwater seismic pulse as recited in claim 9, wherein a quantity of compressed gas is introduced into each of the bubbles to suppress secondary oscillations thereof.

11. The method for generating an underwater seismic pulse as recited in claim 9, wherein the quantity of compressed gas introduced into the bubble to suppress secondary oscillations is not more than one-third of the compressed gas initially utilized to produce the corresponding bubble.

* * * * *